US011767753B2

(12) United States Patent
Seabrook et al.

(10) Patent No.: US 11,767,753 B2
(45) Date of Patent: Sep. 26, 2023

(54) METHOD FOR FLOW PROFILING USING TRANSIENT ACTIVE-SOURCE HEATING OR COOLING AND TEMPERATURE PROFILING

(71) Applicant: ExxonMobil Technology and Engineering Company, Spring, TX (US)

(72) Inventors: Brian C. Seabrook, Houston, TX (US); Ted A. Long, Spring, TX (US); Charles J. Mart, Tomball, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 432 days.

(21) Appl. No.: 16/679,941

(22) Filed: Nov. 11, 2019

(65) Prior Publication Data

US 2020/0173274 A1 Jun. 4, 2020

Related U.S. Application Data

(60) Provisional application No. 62/775,081, filed on Dec. 4, 2018.

(51) Int. Cl.
*E21B 47/103* (2012.01)
*G01M 3/00* (2006.01)
*E21B 47/04* (2012.01)

(52) U.S. Cl.
CPC ............ *E21B 47/103* (2020.05); *E21B 47/04* (2013.01); *G01M 3/002* (2013.01)

(58) Field of Classification Search
CPC ....... G01M 3/002; E21B 47/103; E21B 47/04
USPC ........................................................ 73/152.33
See application file for complete search history.

(56) References Cited

U.S. PATENT DOCUMENTS

| | | | |
|---|---|---|---|
| 8,146,656 B2 | 4/2012 | Brown | |
| 9,500,554 B2 | 11/2016 | Kulkarni et al. | |
| 9,557,437 B2 | 1/2017 | Seller et al. | |
| 10,697,291 B2* | 6/2020 | Nyhavn | E21B 47/11 |
| 2008/0181554 A1* | 7/2008 | Taverner | G01K 15/00 |
| | | | 374/E11.015 |
| 2009/0173494 A1* | 7/2009 | Tarvin | E21B 47/07 |
| | | | 166/250.15 |
| 2013/0000398 A1* | 1/2013 | DiFoggio | E21B 47/103 |
| | | | 73/152.18 |
| 2013/0341008 A1* | 12/2013 | Brady | E21B 47/103 |
| | | | 166/250.01 |
| 2018/0223647 A1* | 8/2018 | Johnston | E21B 47/113 |
| 2019/0004393 A1* | 1/2019 | Hashiya | G01S 7/4817 |

* cited by examiner

*Primary Examiner* — Kristina M Deherrera
*Assistant Examiner* — Jean F Morello
(74) *Attorney, Agent, or Firm* — ExxonMobil Technology and Engineering Company—Law Department (57) ABSTRACT

A method and apparatus are provided for determining movement of a fluid into or out of a subsurface wellbore, to thereby enable accurate allocation of fluids being produced by or injected into each of several zones of the wellbore. A temperature change is effected in the fluid in a semi-continuous or pulsed manner at one or more locations in the wellbore. A temperature of the fluid is measured at one or more sensing locations downstream of the location of the temperature change. A time of flight model is used to determine, for a plurality of points of interest, a fluid flow direction, bulk flow rate and/or a cumulative flow rate contribution.

17 Claims, 5 Drawing Sheets

METHOD FOR FLOW PROFILING USING TRANSIENT ACTIVE-SOURCE HEATING OR COOLING AND TEMPERATURE PROFILING

CROSS REFERENCE TO RELATED APPLICATIONS

This application claims the priority benefit of U.S. Provisional Patent Application No. 62/775,081, filed Dec. 4, 2018, entitled METHOD FOR FLOW PROFILING USING TRANSIENT ACTIVE-SOURCE HEATING OR COOLING AND TEMPERATURE PROFILING.

FIELD

The present disclosure relates generally to drilling for hydrocarbons. More specifically, the present disclosure relates to determining flow profiles in a wellbore.

BACKGROUND

In the oil and gas industry, it is desirable to obtain flow data from a wellbore. It is more particularly desirable to determine the locations and flow rates of various inflows into a wellbore. The practice of determining the locations and flow rates of various inflow zones in a subsurface formation is known as zonal allocation. Cumulative flow profiling along the length of a wellbore has traditionally been done using mechanical spinner surveys. Often a temperature log is used in combination with the spinner, which is sometimes unduly influenced by the presence of gas or wellbore geometry in the case of multi-phase flows.

Figure 1:
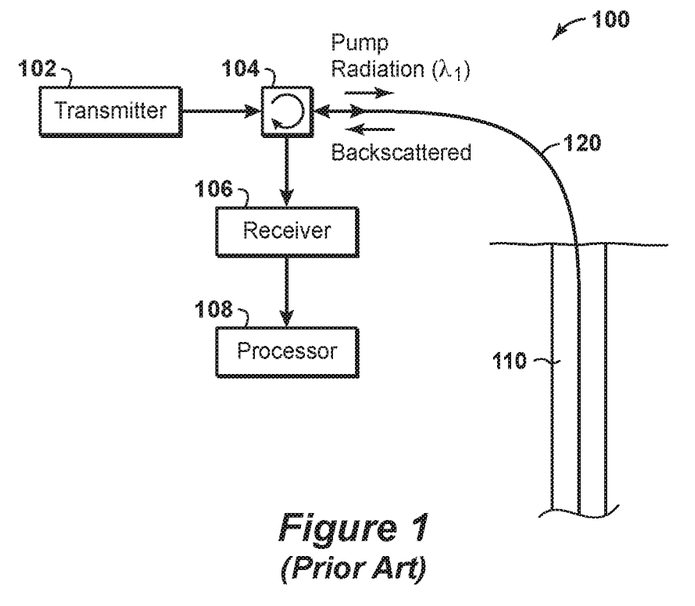
FIG. 1 is a schematic diagram of a known DFOS system.
Figure 2:
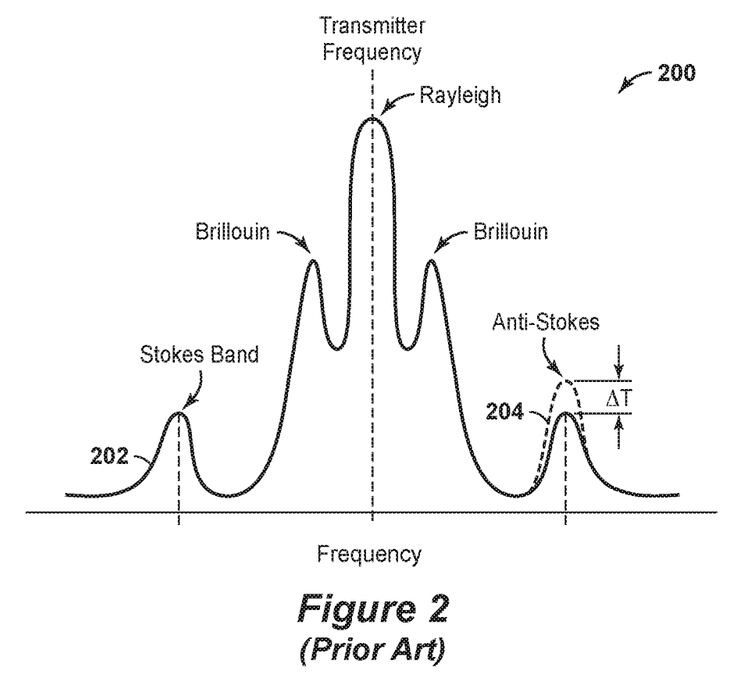
FIG. 2 is a graph showing a waveform generated by the DFOS system of FIG. 1.

Recently the use of standalone temperature logging via permanently or temporarily installed distributed fiber optic sensing (DFOS) systems have been successfully used for zonal allocations in both deviated and vertical wells. DFOS techniques enable monitoring the temperature along the length of a wellbore using an optical waveguide, such as an optical fiber, as a temperature sensor. In a typical DFOS system, a laser or other light source at the surface of the well transmits a pulse of light into a fiber optic cable installed along the length of a well. Due to interactions with molecular vibrations within the glass of the fiber, a portion of the light is scattered back towards the surface (this phenomenon includes Rayleigh, Brillouin, and/or Raman scattering, but will be generically referred to herein as "scattering"). FIG. 1 illustrates a conventional DFOS system 100 for measuring the temperature in a wellbore 110. A transmitter 102 irradiates a waveguide 120 with light signals (pump radiation) capable of causing scattering. A coupler 104 includes suitable optical elements to guide pump radiation down the waveguide 120 and guide backscattered light signals to a receiver 106. The receiver 106 translates the backscattered light signals into electrical signals that are fed to a processor 108 capable of generating a distributed temperature profile therefrom. FIG. 2 is a graph 200 illustrating a waveform 202 across a spectrum of backscattered light signals generated by the pump radiation. As illustrated, the backscattered signals include smaller amplitude signals in the Stokes and anti-Stokes bands for the Brillouin and/or Raman scattering, as well as a larger Rayleigh peak. The backscattered signals are typically processed by the processor 108 at the surface to determine temperature and/or temperature change over time at the backscatter source location for each subsequent light pulse. For a Raman system, we calculate a ratio of power between upper and lower frequency bands of detected signals. There is a known temperature dependence of this ratio, which allows for convenient temperature sensing based on the detected light signals scattered to the surface. The anti-Stokes signal is sensitive to temperature changes, which result in changes in amplitude of the anti-Stokes signal (as illustrated by the dashed line 204), while the Stokes signal is insensitive to temperature. For a Brillouin system, we determine the peak frequency of both the Stokes and anti-Stokes signals. The shift in both frequency peaks with temperature changes and strain is a well-known effect. For coherent Rayleigh detection systems, the frequency of the peak does not shift, but the phase shift between subsequent pulses is used to determine changes in temperature and strain and/or vibration. Because speed of light in the waveguide 120 is known, it is possible to determine positions along the fiber at which scattering occurred, based on the time of arrival of the backscattered light signals. Hence, the DFOS system is capable of measuring temperature and/or temperature change as a continuous function of position over a length of the fiber, which may be correlated to a depth of the wellbore.

Most zonal allocation workflows using temperature data rely on the difference between the fluid temperature entering the wellbore from the reservoir at each depth and the (typically warmer) fluid temperature of the fluid already in the wellbore flowing from deeper in the well. By calculating the expected heat loss as the fluid travels up the well, the expected temperature due to mixing of the fluids entering the wellbore, and the impact of any Joule-Thomson heating/cooling of the fluids as they change pressure, it is possible to use detailed temperature measurements to model the zonal inflows along the wellbore. However, this difference in fluid entry temperature along the length of the wellbore is generally very small in highly deviated or horizontal wells. For these wells a different technique is required which does not rely on the natural geothermal temperature gradient.

Additionally, the traditional conveyance of the spinner or temperature logging device has been via wireline/cable in vertical wells and via coiled tubing in deviated wells. With increasing length of the horizontal portion of the wellbore, larger diameter coiled tubing must be employed to reach the end of the well. As the measuring device takes up a larger portion of the cross-section, the flow inside the wellbore is increasingly altered by the presence of the device.

Time of flight measurements in wellbores have been routinely used, for example in chemical tracer surveys, where a particular chemical is released from a known location and its arrival at one or more sensing locations downstream can be used to calculate the average velocity between the source and receiver points or between two receiver points. Likewise, using DFOS temperature surveying, a thermal pulse can be created at one or more points along the wellbore to sharply raise or lower the temperature of the fluid at these known points and at a known time, which can be observed at several sensing locations to calculate the average velocity of the fluid between those points. This translates to bulk flow rate in wellbores. In the case of a DFOS system, a profile along the entire length of the well may be recorded as long as the thermal pulse is still discernable.

U.S. Pat. No. 9,557,437 to Selker, et al. discloses a geohydrology monitoring system that uses a heating mechanism to heat water in a well. The heating mechanism comprises an array of heating elements that heat water in a well. A system measures the temperature of the water and infers flow information from the temperature measurements. The geohydrology monitoring system described in the '437 patent has a few expected shortcomings, however, when applied to oil and gas production or water/hydrocarbon injection wells: First, the flow rates in such wells are significantly higher than those encountered in geohydrologic monitoring. This means that the temperature spikes caused by an array heater interfere with or "smear" into one another, making it very difficult to use a numerical model to clearly define fluid flow direction or cumulative flow rate contribution. Second, there are significant challenges in installing and/or deploying an array heater, which is a critical consideration in long horizontal and particularly in unconventional hydrocarbon wells. Specifically, installation outside the casing is typically a problem, since casing running may be mechanically aggressive and require rotation, jarring, and reciprocation of the casing string to reach total depth. Also, the extra time of clamping the assembly to the outside of casing joints normally may add an unacceptable amount of rig time and cost to the drilling operation. Installation of the heating array inside the casing and directly in contact with the production or injection fluids is also not desirable as there is often debris which flows and will either stick to the array tool or obstruct the well during operation, so the need for a clear casing inside diameter is key and the ability to mechanically clean out any debris is required. This is normally addressed in the petroleum industry by running tools on coiled tubing, rods or tractored wireline in long horizontal wells that are specially designed to have a minimum diameter and specially tapered to move through debris in the casing.

The third shortcoming of the '437 patent is that the operating environment in hydrocarbon wells is simply non-analogous to what is experienced in the geohydrologic monitoring field. For example, temperatures in excess of 300 degrees Fahrenheit and pressures of several thousand psi are not unusual in a hydrocarbon well, and the fluids encountered are often severely corrosive. Electronics and metallic components need to be specially designed to handle these aggressive conditions, and such design considerations are neither considered nor suggested by the '437 patent. What is needed is a method of obtaining temperature measurements in a wellbore (and specifically, a horizontal wellbore or a highly deviated wellbore) that does not require a mechanical spinner array—which requires the use of a wireline tractor or large diameter tubing—and provides some other source of temperature change inside the wellbore to estimate fluid flow direction and/or a cumulative flow rate contribution, since fluid entry temperature is fairly uniform along the wellbore.

SUMMARY

In one aspect, a method is provided for determining movement of a fluid into or out of a subsurface wellbore. This method enables accurate allocation of fluids being produced by or injected into each of several zones of the wellbore. A temperature change is effected in the fluid at one or more locations in the wellbore. A temperature of the fluid is measured at one or more sensing locations downstream of the location of the temperature change. If the thermal change is effected by intermittent heating or cooling at a discrete point along the wellbore it is possible to create a sharp temperature spike, or other measurable temperature variation, which can be seen to move along the wellbore as the fluid flows. Using time of flight calculations based on the observed movement of the thermal pulse it is possible to determine, for a plurality of points of interest, a fluid flow direction and/or a cumulative flow rate contribution.

In another aspect, a system for determining movement of a fluid into or out of a subsurface wellbore is provided, to thereby enable accurate allocation of fluids being produced by or injected into each of several zones of the well. Means are provided for effecting a temperature change in the fluid at one or more locations in the wellbore. Means are provided for measuring a temperature of the fluid at one or more sensing locations downstream of the location of the temperature change. Means are provided for effecting, by intermittent heating or cooling at discrete locations along the wellbore, a sharp temperature spike or other measurable temperature variation that will move along the wellbore with fluid flow. Means are provided for using a time of flight model based on the observed movement of the thermal pulse to determine, for a plurality of points of interest, a fluid flow direction, bulk flow rate and/or a cumulative flow rate contribution. Additionally, the dispersion of the thermal pulse may be measured or monitored to determine various bulk fluid properties of the fluid flow.

DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. This disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation. The forms disclosed herein are illustrated by way of example, and not by way of limitation, in the figures of the accompanying drawings and in which like reference numerals refer to similar elements and in which:

DETAILED DESCRIPTION

Terminology

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

About: As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Above/below: In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

Any: The adjective "any" means one, some, or all indiscriminately of whatever quantity.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Based on: "Based on" does not mean "based only on", unless expressly specified otherwise. In other words, the phrase "based on" describes both "based only on," "based at least on," and "based at least in part on."

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Determining: "Determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Embodiments: Reference throughout the specification to "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

Exemplary: "Exemplary" is used exclusively herein to mean "serving as an example, instance, or illustration." Any embodiment described herein as "exemplary" is not necessarily to be construed as preferred or advantageous over other embodiments.

Flow diagram: Exemplary methods may be better appreciated with reference to flow diagrams or flow charts. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an exemplary method. In some examples, blocks may be combined, may be separated into multiple components, may employ additional blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in series, and/or at substantially different points in time. In some examples, methods may be implemented as processor executable instructions. Thus, a machine-readable medium may store processor executable instructions that if executed by a machine (e.g., processor) cause the machine to perform a method.

May: Note that the word "may" is used throughout this application in a permissive sense (i.e., having the potential to, being able to), not a mandatory sense (i.e., must).

Order of steps: It should also be understood that, unless clearly indicated to the contrary, in any methods claimed herein that include more than one step or act, the order of the steps or acts of the method is not necessarily limited to the order in which the steps or acts of the method are recited.

As used herein, the term "formation" refers to any definable subsurface region. The formation may contain one or more hydrocarbon-containing layers, one or more non-hydrocarbon containing layers, an overburden, and/or an underburden of any geologic formation.

As used herein, the term "hydrocarbon" refers to an organic compound that includes primarily, if not exclusively, the elements hydrogen and carbon. Examples of hydrocarbons include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° C. and 1 atm pressure). Hydrocarbon fluids may include, for example, oil, natural gas, gas condensates, coal bed methane, shale oil, shale gas, and other hydrocarbons that are in a gaseous or liquid state.

As used herein, the term "sensor" includes any sensing device or gauge capable of monitoring or detecting pressure, temperature, fluid flow, vibration, resistivity, or other formation and/or fluid data. The sensor may be an electrical sensor, an optical sensor, or any other suitable type of sensor. Alternatively, the sensor may be a position sensor.

As used herein, the term "subsurface" refers to geologic strata occurring below the earth's surface.

As used herein, the term "wellbore" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

Description

Specific forms will now be described further by way of example. While the following examples demonstrate certain forms of the subject matter disclosed herein, they are not to be interpreted as limiting the scope thereof, but rather as contributing to a complete description.

According to disclosed aspects, a method is disclosed for determining locations and flow rates of multiple inflows and/or outflows into or out of a wellbore. The wellbore may be vertical, horizontal, curved, deviated or any combination thereof. One or more sources of heating or cooling are deployed at one or more locations along the wellbore to create measurable temperature differences between the flowing wellbore fluids and locally modified fluid temperature. With these measured temperature differences, it becomes possible to model the heat transfer associated with each downstream inflow or outflow, by location, and to therefore calculate the flow rate of each inflow or outflow. This was previously made difficult in horizontal wells since production inflows come in at approximately the same temperature and injection outflows exit the well at approximately the same temperature. Temperature differences can be induced at one or more locations or can be initiated by moving a source along the wellbore.

Figure 3:
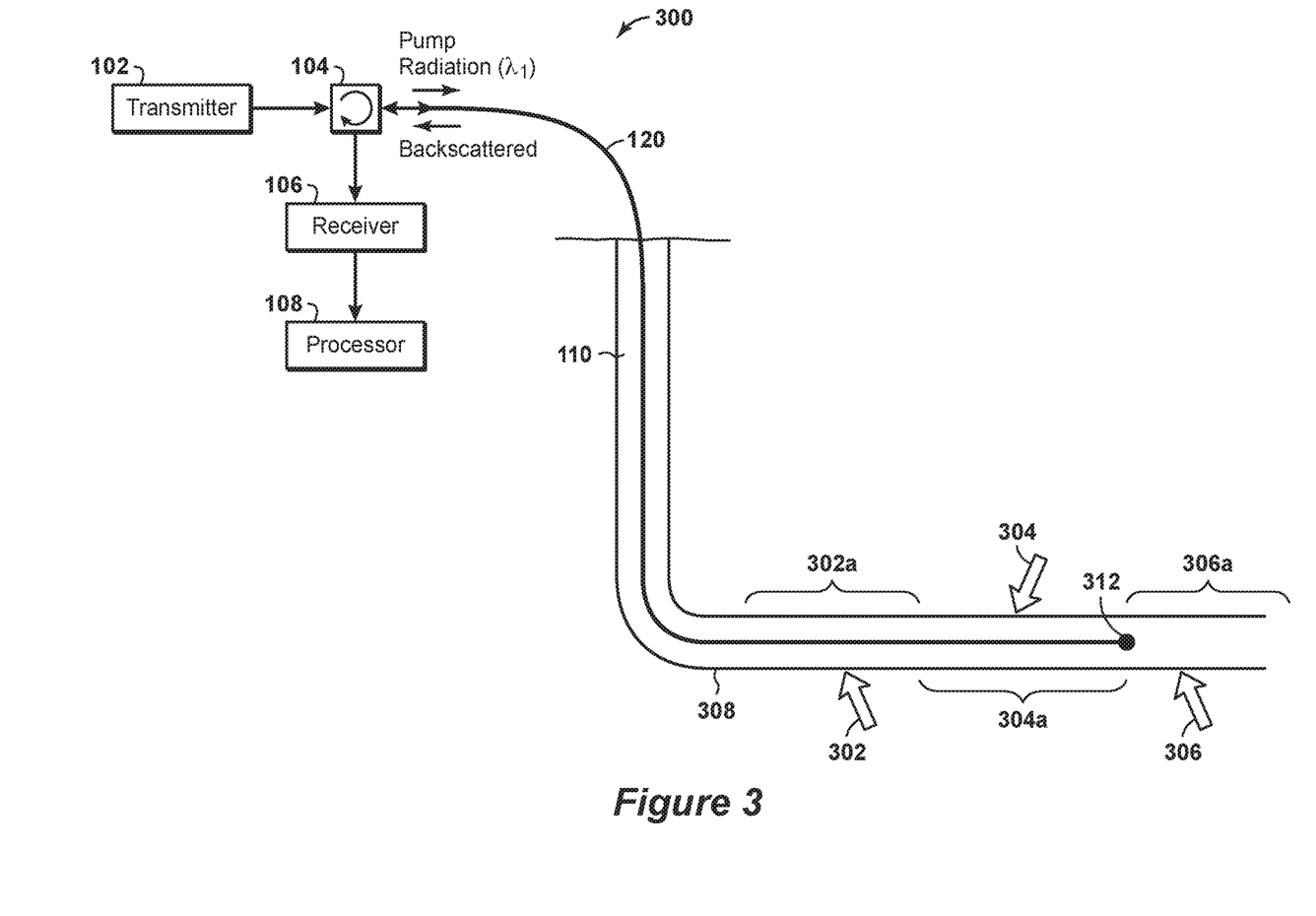
FIG. 3 is a schematic diagram of a temperature measurement system according to disclosed aspects.

FIG. 3 depicts a temperature measurement system according to disclosed aspects. The temperature measurement system is a distributed fiber optic sensing (DFOS) system, which in this non-limiting example is a distributed temperature sensing (DTS) system 300. DTS system 300 may be used to measure the temperature in a wellbore 110 or for other purposes. A transmitter 102 irradiates a waveguide 120 with light signals (pump radiation) capable of causing scattering. A coupler 104 includes suitable optical elements to guide pump radiation down the waveguide 120 and guide backscattered light signals to a receiver 106. The receiver 106 translates the backscattered light signals into electrical signals that are fed to a processor 108 capable of generating a distributed temperature profile therefrom. FIG. 2 illustrates the waveform 202 across a spectrum of backscattered light signals generated by the pump radiation. As illustrated, the backscattered signals include signals in the Stokes and anti-Stokes bands. These signals are typically processed by the processor 108 at the surface to calculate a ratio of the magnitude of backscattered light intensity between upper and lower frequency bands of detected signals. There is a known temperature dependence of this ratio, which allows for convenient temperature sensing based on the detected light signals scattered to the surface. The anti-Stokes signal is sensitive to temperature changes, which result in changes in amplitude of the anti-Stokes signal (as illustrated by the dashed line 204), while the Stokes signal is insensitive to temperature. Because the speed of light in the waveguide 120 is known, it is possible to determine positions along the fiber at which scattering occurred, based on the time of arrival of the backscattered light signals. Hence, the DTS system is capable of measuring temperature as a continuous function of position over a length of the fiber, which may be correlated to a depth of the wellbore.

As previously discussed, most zonal allocation workflows using temperature data rely on the difference between the fluid temperature entering the wellbore from the reservoir at each depth and the (typically warmer) fluid temperature of the fluid already in the wellbore flowing from deeper in the well. By calculating the expected heat loss as the fluid travels up the well, the expected temperature due to mixing of the fluids entering the wellbore, and the impact of any Joule-Thomson heating/cooling of the fluids as they change pressure, it is possible to use detailed temperature measurements to model the zonal inflows along the wellbore. However, this difference in fluid entry temperature along the length of the wellbore is generally very small in highly deviated or horizontal wells. As shown in FIG. 3, hydrocarbon inflows 302, 304, 306 enter a horizontal portion 308 of the wellbore 110. Because the natural geothermal temperature gradient is assumed to be the same at similar depths, a method relying on depth-based temperature differences will not provide reliable flow predictions.

According to aspects of the disclosure, a means for effecting a temperature change is provided in the wellbore. In an aspect, the means for effecting a temperature change is a temperature changing element, which is shown here as a heating element 312. As shown in FIG. 3, the heating element 312 generates a pulse of heat that alters the fluid temperature between flowing zones 302a, 304a, 306a. With a sufficiently dense spatial measurement of temperature, such as with a DTS system, the movement of the fluid heated by the heating element can be tracked over a known distance for a known length of time to calculate the bulk velocity of the fluid. By repeating this process between each inflow zone, changes in fluid flow rate due to inflows or outflows of fluid in each zone can be computed, to provide zonal allocation in a commingled, highly deviated or horizontal well. In addition to bulk velocity measurements, the rate of spreading of the temperature variation can be analyzed to characterize aspects of the fluid mixture such as slip velocity and bulk thermal conductivity.

Figure 4A:
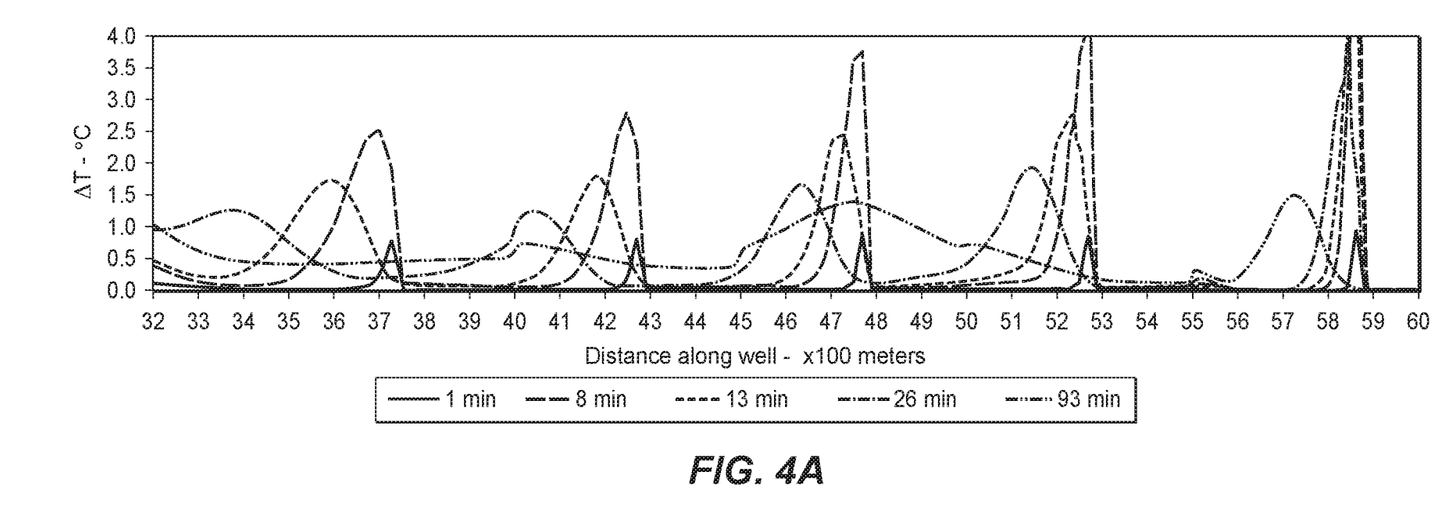
FIGS. 4A and 4B are graphs showing simulated temperature read-outs as a function of depth using the temperature measurement system according to disclosed aspects.
Figure 4B:
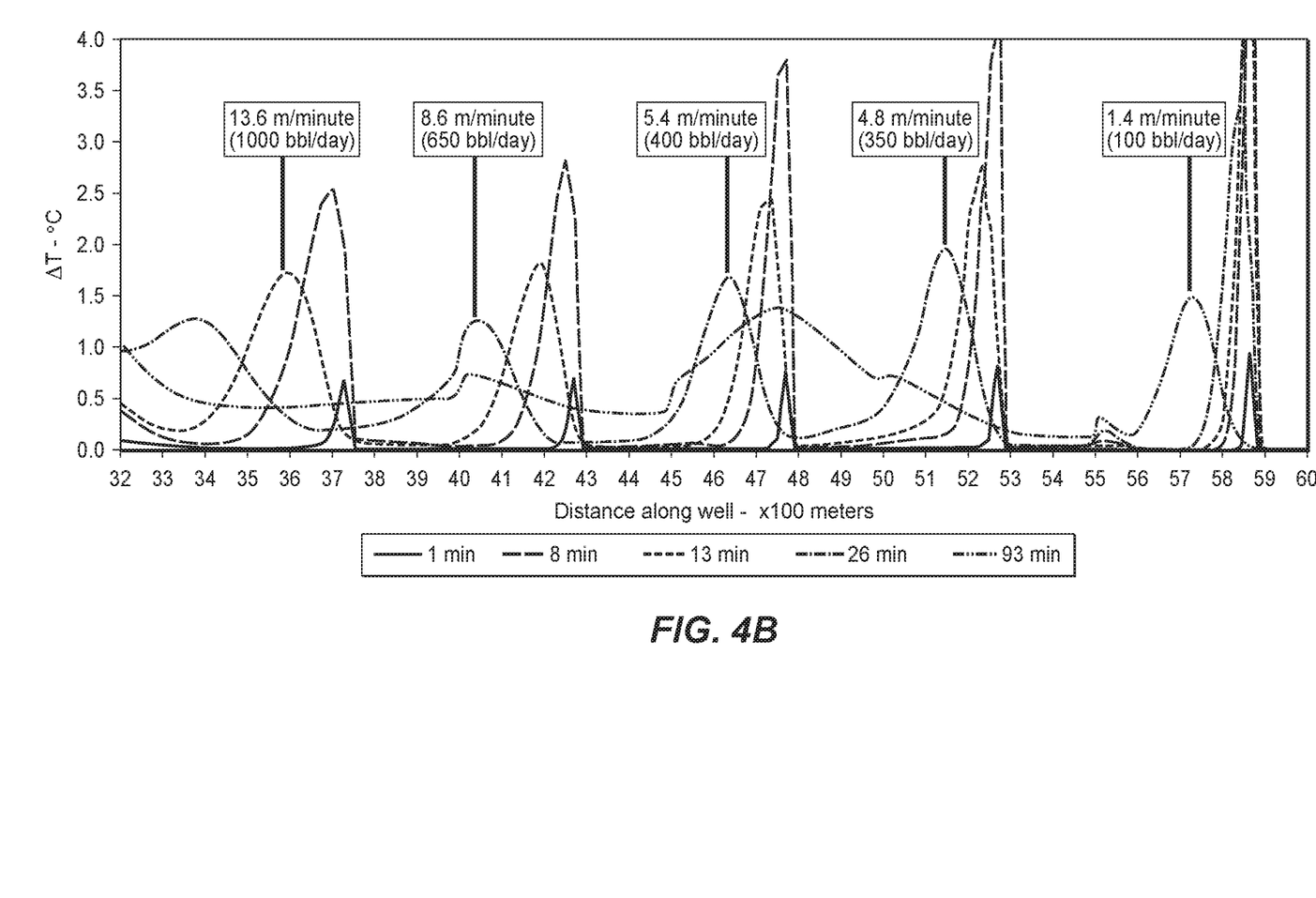
Figure 4C:
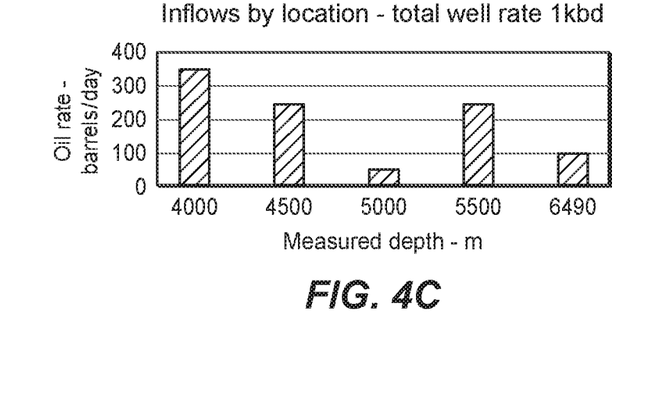
FIG. 4C is a graph showing predicted inflows to a hydrocarbon well according to disclosed aspects.

FIGS. 4A-4C demonstrate how the disclosed aspects may be used. In the case shown in FIG. 4A, the wellbore fluid from each of five inflow locations—6,490 meters, 5,500 meters, 5,000 meters, 4,500 meters, and 4,000 meters—has been heated at minute 1. The heating is deactivated at minute 6, while the temperatures along the well were recorded up to minute 93. The distance traveled by the heated wellbore fluid from each heater location to a downstream location over a known time interval between measurements can be recorded. This yields a cumulative flow rate at each heater location in terms of meters per minute. Multiplying this linear flow rate by flow area (i.e., the cross-sectional area of flow in the wellbore) provides the volumetric flow rate for each of the inflow locations, as shown in FIG. 4B. As can be seen in FIG. 4C, this well is producing 1,000 barrels of oil per day total, demonstrating that, based on time of flight measurements, flow rates from hydrocarbon inflows (such as those shown in FIG. 3) may be predicted.

According to the disclosed aspects, a system and method is provided to effect a temperature change in a wellbore fluid, which serves to add or remove thermal energy from a producing or injecting oil and/or gas and/or water well, to enable the accurate identification of the amount and flow direction of fluids being produced or injected to each of several zones connected to the well. As previously discussed, this thermal energy may be provided by one or more heat sources or cooling locations, thereby providing pulsed thermal influence, enabling time of flight calculations to be done for each pulse, such that the fluid flow direction and cumulative rate contribution can be quantitatively determined at each point of interest. Measurements acquired by this system and method include temperature at several points along the well.

The system and method disclosed herein may determine fluid velocity at several points by time-of-flight calculations of dispersion of the thermal pulse up or down the well. The disclosed aspects may be used with any system for distributed fiber optic sensing of temperature and/or change of temperature measurement, such as the DFOS system as disclosed herein. Other temperature sensing systems may include a series of thermocouples or other sensors may be arranged at various locations throughout the wellbore. For example, the sensors may be positioned outside the casing in cemented and/or uncemented casing segments. The sensors may be positioned outside of tubing strings that are inside the well casing. Alternatively or additionally, the sensors may be positioned inside capillary tubes installed inside the well. Such capillary tubes may be pumped down or mechanically tractored into the well. In another aspect, temperatures may be sensed using a plurality of fiber Bragg gratings etched on a length of an optical fiber. In this instance, the optical fiber expands or contracts slightly as a function of temperature, and a precise temperature therefore may be measured by sensing positional changes in the etched gratings due to the temperature-induced strain. Other suitable temperature sensing systems may be used.

The means of effecting a temperature change has been described herein as being a temperature modifying element such as a heating element. The heating element may be electrically powered. Alternatively, the means for effecting a temperature change may be a radiation source that generates heat through the principles of nuclear decay. In another aspect, an exothermic or endothermic chemical reaction may be used to effect the temperature change. In a non-limiting example, one or more chemically reactive fluids or solids or may be separately transported through a tube in the wellbore and permitted to react with one another at a desired location, thereby creating a source of heat or cold. In still another aspect, a piezoelectric element may be employed to reduce the temperature at a location according to known principles. In still another example, a heated or cooled fluid may be pumped to a desired location in the wellbore and permitted to combine with other fluids flowing therein. Other means of effecting a temperature change may alternatively be used in accordance with disclosed aspects. The means for effecting the temperature change may operate in a semi-continuous manner or in a pulsed manner.

It is possible that the temperature boost created by a single means for effecting a temperature change decays too quickly to be measured by a desired number of temperature sensors. Likewise, it is possible that a single means for effecting a temperature change cannot increase the temperature sufficient to be accurately measured. According to the disclosure, more than one means for effecting a temperature change may be employed at the same or at different locations in the wellbore. The means so employed may be of the same type (i.e., two electronic heating elements) or may differ (i.e., a piezoelectric element and an endothermic chemical reaction). The plurality of means may thereby provide sufficient temperature differentiation for the discrete temperature measurement points as disclosed herein.

If the change in temperature is effected by intermittent heating or cooling at a discrete point along the wellbore, it is possible to create a measurable temperature variation, which may take the form of a sharp temperature spike, a temperature pulse, a step change, a series of pulses, a sinusoidal wave, or any other repeating or non-repeating temperature variation.

The disclosed aspects may also be used with fiber optic distributed pressure measurements. The disclosed aspects may be used with several discrete pressure sensors and/or fluid flow sensors. The means for effecting a temperature change may be deployed in a wellbore using rods, a continuous rod, a hollow continuous rod, drill pipe, or tubing. It may alternatively be deployed with coiled tubing, or with wireline or a tractored wireline. Lastly, the means of effecting the temperature change and associated sensors may be used in conjunction with various computational, communications, and/or storage technologies.

Figure 5:
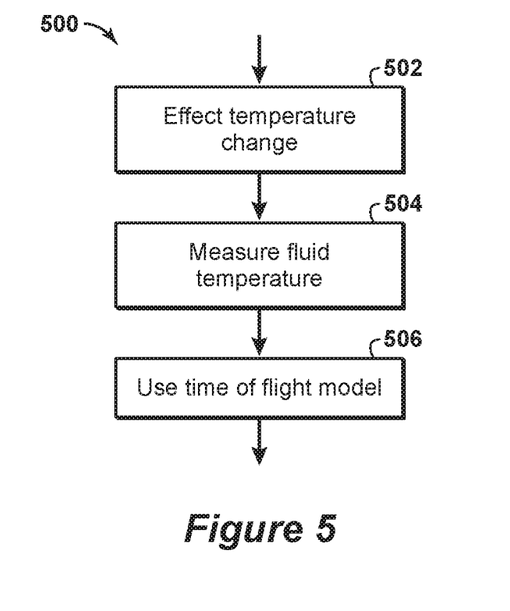
FIG. 5 is a flowchart of a method of determining movement of a fluid into or out of a subsurface wellbore according disclosed aspects.

FIG. 5 is a flowchart showing a method 500 of determining movement of a fluid into or out of a subsurface wellbore. This method enables accurate allocation of fluids being produced by or injected into each of several zones of the wellbore. At block 502 a temperature change is effected in the fluid at a first location in the wellbore. The temperature change may be effected by, for example, an electric heating element or any other temperature-changing element described herein. At block 504 a temperature of the fluid is measured at one or more sensing locations downstream of the location of the temperature change. A change in temperature between the first location and each of the one or more sensing locations is representative of heat flow within the wellbore. At block 506 a time of flight model is used to determine, for a plurality of points of interest, a fluid flow direction and/or a cumulative flow rate contribution.

One or more steps of the disclosed aspects may be accomplished using a computing device. For example, a computing device is particularly suited for automating repeat time of flight and flow rate calculations for a plurality of points along the wellbore. One of ordinary skill in the art will readily understand how to employ a computing device to accomplish various aspects of the disclosure.

Further illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

1. A method of determining movement of a fluid into or out of a subsurface wellbore, to thereby enable accurate allocation of fluids being produced by or injected into each of several zones of the wellbore, comprising:

effecting a semi-continuous or pulsed temperature change in the fluid at one or more locations in the wellbore;

measuring a temperature of the fluid at one or more sensing locations downstream of the location of the temperature change, wherein a change in temperature between each thermal pulse location and each of the one or more sensing locations is representative of fluid flow within the wellbore;

using a time of flight model, determining, for a plurality of points of interest, a fluid flow direction, bulk flow rate and/or a cumulative flow rate contribution.

2. The method of paragraph 1, wherein the one or more locations are in the wellbore.

3. The method of paragraph 1 or paragraph 2, wherein the temperature or change in temperature is sensed using a distributed fiber optic sensing system, making use of Rayleigh, Brillouin, or Raman backscatter signals individually or in combination.

4. The method of paragraph 1 or paragraph 2, wherein the temperature is sensed using one or more thermocouples, and wherein at least one thermocouple is disposed at each of the plurality of sensing locations.

5. The method of paragraph 1 or paragraph 2, wherein the temperature is sensed using a plurality of gratings on an optical fiber inserted into the wellbore, and wherein at least one of the plurality of gratings are disposed at each of the plurality of sensing locations.

6. The method of any one of paragraphs 1-5, further comprising using a temperature modifying element to effect the temperature change.

7. The method of paragraph 6, wherein the temperature modifying element is selected from one or more of the following: an electrically powered heating element, a radiation source, or a piezoelectric element.

8. The method of any one of paragraphs 1-5, wherein the temperature change is effected by pumping a heating fluid or a cooling fluid to the first location.

9. The method of any one of paragraphs 1-5, wherein the temperature change is effected by an exothermic chemical reaction or an endothermic chemical reaction at the first location.

10. The method of any one of paragraphs 1-9, wherein the temperature is effected in at least one of a semi-continuous manner and a pulsed manner 11. The method of any one of paragraphs 1-10, wherein the heat flow profile is generated using a steady-state or a transient thermal analysis of the heat flow.

12. The method of any one of paragraphs 1-11, further comprising:

measuring a flow rate of the fluid at one or more flow rate sensing locations downstream of the location of the temperature change;

using a time of flight model, determining, for a second plurality of points of interest, a fluid flow direction, bulk flow rate and/or a cumulative flow rate contribution.

13. The method of any one of paragraphs 1-12, further comprising:

deploying the means of effecting the temperature change using one or more of a continuous rod, a plurality of rods, a hollow continuous rod, drill pipe, tubing, coiled tubing, wireline, or a tractored wireline.

14. A system for determining movement of a fluid into or out of a subsurface wellbore, to thereby enable accurate allocation of fluids being produced by or injected into each of several zones of the well, comprising:

means for effecting a temperature change in the fluid at a first location in the wellbore;

means for measuring a temperature of the fluid at one or more sensing locations downstream of the location of the temperature change, wherein a change in temperature between the first location and each of the one or more sensing locations is representative of heat flow within the wellbore;

means for using a time of flight model to determine, for a plurality of points of interest, a fluid flow direction, bulk flow rate and/or a cumulative flow rate contribution.

15. The system of paragraph 14, wherein the means for effecting a temperature change is a temperature modifying element.

16. The system of paragraph 15, wherein the temperature modifying element comprises at least one of an electrically powered heating element, a radiation source, or a piezoelectric element.

17. The system of paragraph 14, wherein the means for effecting a temperature change comprises a heating fluid or a cooling fluid that is pumped to the location in the wellbore.

18. The system of paragraph 14, wherein the means for effecting a temperature change is an exothermic chemical reaction or an endothermic chemical reaction at the first location.

Industrial Applicability

The apparatus and methods disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What we claim:

1. A method of determining movement of a fluid into or out of a subsurface wellbore, to thereby enable accurate allocation of fluids being produced by or injected into each of several zones of the wellbore, comprising:

effecting a semi-continuous or pulsed temperature change by a temperature changing element disposed directly within the wellbore in the fluid at one location in the wellbore, the temperature changing element comprising a single heating element being disposed on a waveguide that receives a signal indicative of temperature within the wellbore;

measuring a temperature of the fluid at a plurality of sensing locations downstream of the location of the temperature change, wherein a change in temperature between each of the plurality of sensing locations is representative of fluid flow within the wellbore; and using a time of flight model, determining, for a plurality of points of interest, a fluid flow direction, bulk flow rate and/or a cumulative flow rate contribution.

2. The method of claim 1, wherein the plurality of sensing locations are in the wellbore.

3. The method of claim 1, wherein the temperature or change in temperature is sensed using a distributed fiber optic sensing system, making use of Rayleigh, Brillouin, or Raman backscatter signals individually or in combination.

4. The method of claim 1, wherein the temperature is sensed using one or more thermocouples, and wherein at least one thermocouple is disposed at each of the plurality of sensing locations.

5. The method of claim 1, wherein the temperature is sensed using a plurality of gratings on an optical fiber inserted into the wellbore, and wherein at least one of the plurality of gratings are disposed at each of the plurality of sensing locations.

6. The method of claim 1, wherein the temperature modifying element is selected from one or more of the following: an electrically powered heating element, a radiation source, or a piezoelectric element.

7. The method of claim 1, wherein the temperature change is effected by pumping a heating fluid or a cooling fluid to a second location in the wellbore.

8. The method of claim 1, wherein the temperature change is effected by an exothermic chemical reaction or an endothermic chemical reaction at a second location in the wellbore.

9. The method of claim 1, wherein the temperature is effected in at least one of a semi-continuous manner and a pulsed manner.

10. The method of claim 1, wherein the heat flow profile is generated using a steady-state or a transient thermal analysis of the heat flow.

11. The method of claim 10, further comprising:

measuring a flow rate of the fluid at one or more flow rate sensing locations downstream of the location of the temperature change;

using a time of flight model, determining, for a second plurality of points of interest, a fluid flow direction, bulk flow rate and/or a cumulative flow rate contribution.

12. The method of claim 1, further comprising:

deploying a means of effecting the temperature change using one or more of a continuous rod, a plurality of rods, a hollow continuous rod, drill pipe, tubing, coiled tubing, wireline, or a tractored wireline.

13. A system for determining movement of a fluid into or out of a subsurface wellbore, to thereby enable accurate allocation of fluids being produced by or injected into each of several zones of the well, comprising:

a single means for effecting a temperature change disposed directly within the wellbore in the fluid at a first location in the wellbore, the single means for effecting a temperature change being disposed on a waveguide that receives a signal indicative of temperature within the wellbore;

means for measuring a temperature of the fluid at a plurality of sensing locations downstream of the location of the temperature change, wherein a change in temperature between the first location and each of the plurality of sensing locations is representative of heat flow within the wellbore; and means for using a time of flight model to determine, for a plurality of points of interest, a fluid flow direction, bulk flow rate and/or a cumulative flow rate contribution.

14. The system of paragraph 13, wherein the single means for effecting a temperature change is a temperature modifying element.

15. The system of claim 14, wherein the temperature modifying element comprises at least one of an electrically powered heating element, a radiation source, or a piezoelectric element.

16. The system of claim 13, comprising a second means for effecting a temperature change that comprises a heating fluid or a cooling fluid that is pumped to a second location in the wellbore.

17. The system of claim 13, comprising a second means for effecting a temperature change that is an exothermic chemical reaction or an endothermic chemical reaction at a second location in the wellbore.

\* \* \* \* \*